Oct. 29, 1968   D. COOPER ET AL   3,408,513
TIMING NETWORK
Filed Dec. 21, 1964

INVENTORS
DAVID COOPER
JOHN R. SWANSON
BY  *Joseph V. Claeys*
THEIR ATTORNEY 3,408,513
TIMING NETWORK
David Cooper and John R. Swanson, Erie, Pa., assignors to General Electric Company, a corporation of New York
Filed Dec. 21, 1964, Ser. No. 419,668
1 Claim. (Cl. 307—293)

ABSTRACT OF THE DISCLOSURE

A timing circuit for gating on a controlled rectifier wherein an exponentially rising voltage having superimposed pulses is applied to a gating circuit comprising a biased reversely poled diode and a breakdown device serially connected to the gate electrode of the controlled rectifier.

---

This invention relates generally to control circuitry and more particularly to control circuitry for providing an accurate timing period after the occurrence of an event.

While this invention is subject to a wide range of application wherever a time delay is required, such as in computers, supervisory control systems, and the like, it is especially suited to provide for the energization of a load circuit a fixed time after the opening of a pair of separable grounded contacts, such as for example the contacts of a master controller, and will be particularly described in that connection.

It is an object of this invention to provide control circuitry which provides a timing period which is accurate, adjustable and essentially independent of supply voltage variations as well as variations in temperature or component characteristics.

It is another object of this invention to provide control circuitry for providing a timing period which may be initiated in response to the operation of contacts, another circuit means, or other suitable means for signifying the occurrence of an event.

It is a further object of this invention to provide a simplified control circuit for providing a timing period capable of utilizing the highly stable negative resistance characteristics of the semiconductor double base diode device and the power switching characteristics of a controlled rectifier device.

Briefly stated, in accordance with one aspect of this invention, a timing circuit is provided which comprises a source of pulses the repetition rate of which is short compared to the timing period of the circuit. The timing circuit also includes a capacitive means arranged to be charged from a voltage source upon the occurrence of an event, such as the opening of a pair of grounded contacts for example. Means are also provided for establishing a preselected voltage threshold level so that when the threshold is exceeded by the voltage resulting from the summation of the voltage of the pulses and the capacitive means, an output signal is provided. The output signal thus appears a predetermined time after the occurrence of the event and may be utilized in any desired manner such as to provide a gating signal for a controlled rectifier for example.

The novel features of the invention which are believed characteristic of this invention are set forth with particularity in the appended claims. The invention itself, however both as to its organization and method of operation, together with further objects and advantages thereof, may best be understood by reference to the following description taken in connection with the accompanying drawing in which:

Figure 1:
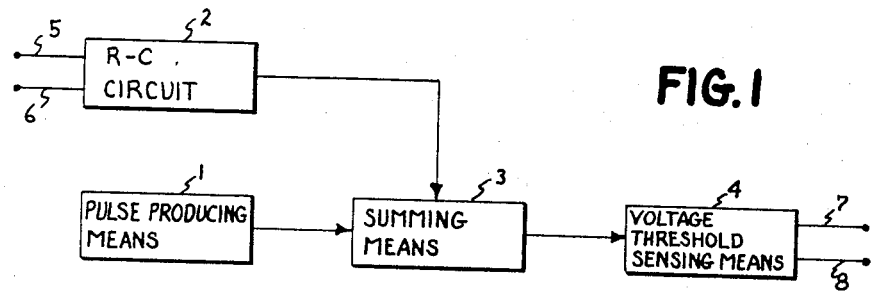
FIG. 1 is a simplified block diagram illustrating the basic arrangement of the control circuit of this invention.

In FIG. 1 there is shown the basic control circuit arrangement of the present invention illustrated in simplified block diagram form. As shown, the control circuit comprises a pulse producing means 1 adapted to provide pulses whose repetition rate is short compared to the time constant of an R-C circuit 2. The outputs of the pulse producing means 1 and the R-C circuit 2 are applied to the summing means 3 where the voltage derived from the output of pulse producing means 1 is added to the voltage of the R-C circuit. The output of summing means 3 is applied to a threshold sensing means 4. The capacitance of the R-C circuit 2 is arranged to be charged upon the occurrence of a specified event, such as the separation of a pair of contacts or application of a suitable input signal to the input terminals 5–6 of the R-C circuit 2. An output signal appears at the output 7–8 of the threshold sensing means 4 when the output of summing means 3 exceeds the threshold level thereof. This occurs a predetermined time after the occurrence of the event which operated to begin the charging of the capacitance of the R-C circuit 2.

Figure 2:
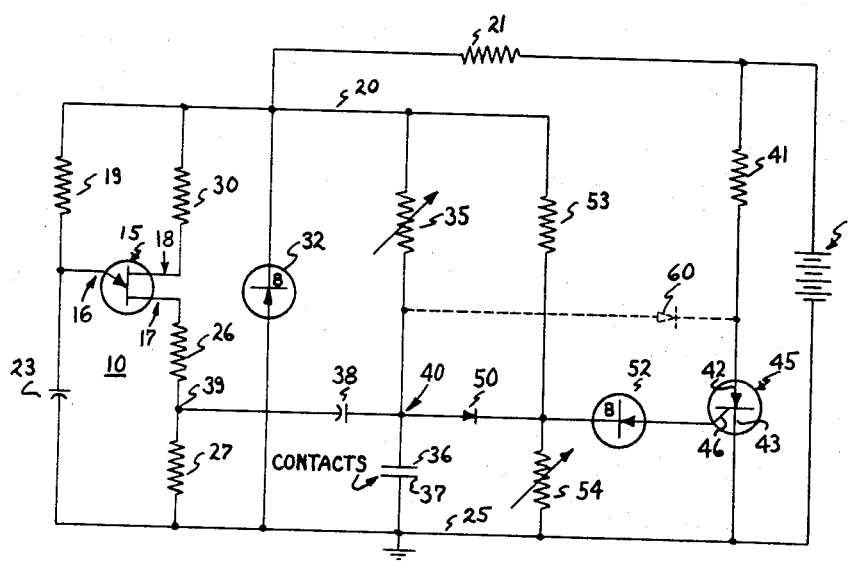
FIG. 2 is a schematic circuit diagram of a timing circuit in accordance with one embodiment of the invention and FIG. 3 is a graph showing the voltage at the point 40 of FIG. 2 which graph is useful in explaining the operation of the circuit of FIG. 2.

Referring now to FIG. 2, there is shown a circuit means, generally designated at 10, for producing pulses whose repetition rate is short compared to the timing period of the timing circuit. Although any suitable pulse producing means meeting the foregoing criteria may be employed, a relaxation type oscillator is preferred. Moreover, because of the highly stable negative resistance characteristics thereof, a relaxation oscillator employing a double base diode device, or so-called unijunction transistor device, is preferred also. Relaxation oscillator circuits of the unijunction transistor type are shown and described in detail on pages 141 and 142 of the *General Electric Transistor Manual*, 5th Edition, Copyrighted 1960, by the General Electric Company.

As shown in FIG. 2, pulse producing means 10 includes unijunction transistor device 15 having an emitter electrode 16, a base one electrode 17 and a base two electrode 18. Emitter electrode 16 is connected through resistance 19 to the conductor 20 which is in turn connected through resistance 21 to the positive side of the supply voltage, shown schematically as the battery 22. Emitter electrode 16 is also connected to one terminal of a timing capacitance 23, the other terminal of which is connected to the negative side of the supply voltage over the common conductor 25. Base one electrode 17 is connected through resistances 26 and 27 to the common conductor 25 while base two electrode 18 is connected to the conductor 20 through resistance 30. A source of reference voltage for the timing circuit is provided between the conductors 20 and 25 by means of a breakdown diode device 32 connected in series with resistance 21 across the battery 22. Resistance 21 serves to bias breakdown diode device 32 into a linear region of its characteristic so that an essentially constant voltage is provided in well-known manner between the conductors 20 and 25.

Resistance 35 is connected in series circuit combination with a pair of separable contacts 36–37 across the conductors 20 and 25. A capacitance 38 is connected between the junctions 39 and 40 between resistances 26 and 27, and resistance 35 and the contacts 36–37 respectively. Capacitance 38 is thus arranged to be charged from the reference voltage source provided by breakdown diode device 32 through resistances 35 and 27 whenever contacts 36–37 are separated.

In accordance with the particular embodiment of the invention shown in FIG. 2, it is desired to energize the load, shown schematically as the resistance 41, a predetermined time after the occurrence of an event, namely, the opening of contacts 36–37. To this end, the anode-cathode elements, 42 and 43 respectively of a controlled rectifier device 45, are connected in series with load 41 across the battery 22. As is well known, such a controlled rectifier device is rendered conductive when, with its anode positive with respect to its cathode, a suitable signal is applied to its gate electrode 46.

In accordance with this invention, the desired gate signal is provided by the foregoing described circuit through a threshold sensing means, shown as including rectifier device 50 and breakdown diode device 52 connected as shown in back-to-back relationship between the junction 40 and gate electrode 46. A voltage divider including series connected resistances 53 and 54 is provided to supply the leakage current for breakdown diode device 52 and also to reverse bias rectifier 50. The combination of rectifier 50 and breakdown diode device 52 thus provides the threshold sensing means which serves to establish a selected threshold voltage level so that a gate signal is applied to gate electrode 46 when the voltage resulting from the summation of the output of the relaxation oscillator and the voltage of capacitance 38 exceeds the threshold level as established by the breakdown voltage level of the breakdown diode device 52, plus the voltage drops of rectifier 50 and the gate-cathode junction of controlled rectifier 45.

Figure 3:
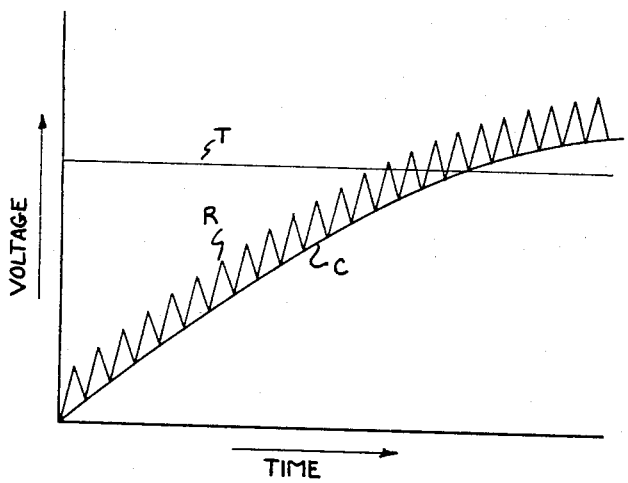

Having described the circuit arrangement of FIG. 2 in detail, its operation upon the opening of contacts 36–37 will now be described. When contacts 36–37 are opened, capacitance 38 begins to charge from the reference voltage, between conductors 20 and 25, through resistances 35 and 27. At the same time the output of relaxation oscillator 10 appears across resistance 27 so that this voltage is added to the voltage on capacitance 38. The values of resistance 35 and capacitance 38 are chosen to provide for a sufficiently long time constant. This summation of the voltage of capacitance 38 and the output of relaxation oscillator 10 as it appears at the junction 40 of FIG. 2 is illustrated in FIG. 3. As shown in FIG. 3, the curve C is the voltage of the capacitance 38 and the curve R is the output of the relaxation oscillator 10 which "rides on top" of the capacitor voltage.

When the peak voltage at the junction 40 exceeds the threshold level, shown at T in FIG. 3, the controlled rectifier 45 fires, energizing the load 41, which may be the coil of a relay, for example. For the embodiment of the invention illustrated in FIG. 2, the threshold level T is the sum of the voltage drops on rectifier 50, gate-cathode junction of controlled rectifier 45 and the breakdown voltage of breakdown diode device 52. Since the voltage of the relaxation oscillator 10 "rides on top" of the exponential charge of the capacitance 38, the output signal and hence the firing of the controlled rectifier 45 is well defined.

Since the frequency of the pulse producing means 10 is relatively high compared to the desired timing period of the timing circuit, the timing period is essentially independent of the frequency of the pulse producing means. Also, since there are no leakage paths across the capacitance 38, the timing period of the circuit is essentially unaffected by temperature variations. Moreover, since the R-C energy required is low, capacitance 38 may be of a small value so that a stable capacitance may be employed, such as a metalized Mylar type for example.

For applications where the contacts 36–37 are not employed, there may be no discharge path for the capacitive means. In such cases a diode device, shown in phantom by the dash lines and identified by the reference numeral 60, may be connected from the junction 40 to the anode 42 to provide such a discharge path. For example, there is a discharge path for capacitance 38 through diode 60 when controlled rectifier 45 becomes conductive.

As will be already apparent from the foregoing description, the occurrence of the event to begin charging of the capacitive means can be implemented in a wide variety of different ways. Thus, the contacts 36–37 need not be located as shown but may be located at various other portions of the circuit so long as, when operated, they cause the capacitive means to being to charge. Moreover, it is not necessary that the event be marked by the operation of contacts. The event may be conveniently marked by actuation of a semiconductor device, operation of another circuit means or other suitable means located similarly to the contacts 36–37 or at any other suitable location. If located as are contacts 36–37, however, the means employed should be a low leakage means so as not to adversely effect the timing period. It will be equally apparent that the control circuit may readily be arranged so that application of a suitable signal thereto could be employed as the means signifying the occurence of the event which would cause the capacitive means to begin to charge.

There has been described a time delay circuit which is extremely simple and provides for energization of a load a predetermined time after the occurrence of an event, such as the opening of a pair of contacts. The time delay is adjustable over a relatively wide range by varying the charging time of the capacitive means, specifically, varying the value of resistance 35 in FIG. 2, and is essentially independent of supply voltage fluctuations, temperature and component variations.

The following values of the circuit components have been found entirely satisfactory in constructing a specific timing circuit in accordance with FIG. 2. It is to be understood, however, that these values are exemplary only and that other values may be substituted therefor:

| | |
|---|---|
| Unijunction transistor 15 | GE #2N2647. |
| Resistance 19 | 10K ohms. |
| Resistance 21 | 800 ohms. |
| Voltage supply (Battery 22) | 37.5 volts (nominal). |
| Capacitance 23 | 0.2 microfarad. |
| Resistance 26 | 47 ohms. |
| Resistance 27 | 500 ohms. |
| Resistance 30 | 470 ohms. |
| Breakdown device 32 | 22 volt #Z4XL22B GE. |
| Resistance 35 | 5K ohms. |
| Capacitance 38 | 2000 microfarad 25 v. (#2520A Mallory Co.). |
| Controlled rectifier 45 | C–20A GE Silicon controlled rectifier. |
| Rectifier 50 | #IN645 GE. |
| Breakdown device 52 | 16 volt #Z4X216B. |
| Resistance 53 | 15K ohms. |
| Resistance 54 | 0–50K ohms variable. |

While only a preferred embodiment of the invention has been shown by way of illustration, many changes and modifications will occur to those skilled in the art. It is, therefore, to be understood that the appended claims are intended to cover all such changes and modifications as fall within the true spirit and scope of the invention.

What we claim as new and desire to secure by Letters Patent of the United States is:

1. A control circuit for actuating a load a predetermined time after the occurrence of an event comprising:
(a) a controlled rectifier having an anode, a cathode and a gate electrode, said anode and cathode electrodes adapted for connection to a load circuit;
(b) a resistance-capacitance timing circuit providing an exponential voltage;
(c) means coupled to said resistance-capacitance circuit for impressing on said exponential voltage periodic voltage pulses having a repetition time which is short compared to said predetermined time to provide an exponential voltage having a pulse component;

(d) a series circuit comprising in the order cited—
  (1) a reversely poled rectifier,
  (2) a breakdown device, and
  (3) the gate and cathode electrodes of said controlled rectifier;

(e) means for coupling said exponential voltage having a pulse component across said series circuit and for biasing said rectifier so that said controlled rectifier is gated on when the aforesaid voltage exceeds a predetermined magnitude.

References Cited

UNITED STATES PATENTS

| | | | |
|---|---|---|---|
| 2,892,101 | 6/1959 | Bright | 307—88.5 |
| 3,131,318 | 4/1964 | Snyder et al. | 307—88.5 |
| 3,209,211 | 9/1965 | Du Vivier | 307—88.5 |
| 3,225,695 | 12/1965 | Kapp et al. | 307—88.5 |
| 3,293,524 | 12/1966 | Parrish | 307—88.5 |

OTHER REFERENCES

G.E. Controlled Rectifier Manual, Fig. 8.2, p. 107, copyright 1960, by G.E. Co.

JOHN S. HEYMAN, *Primary Examiner.*